United States Patent
Kuji et al.

(10) Patent No.: US 11,648,464 B2
(45) Date of Patent: May 16, 2023

(54) CONTROLLER DEVICE

(71) Applicant: Sony Interactive Entertainment Inc., Tokyo (JP)

(72) Inventors: Takuya Kuji, Tokyo (JP); Yuichi Machida, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 148 days.

(21) Appl. No.: 17/263,761

(22) PCT Filed: Aug. 7, 2018

(86) PCT No.: PCT/JP2018/029675
§ 371 (c)(1),
(2) Date: Jan. 27, 2021

(87) PCT Pub. No.: WO2020/031271

PCT Pub. Date: Feb. 13, 2020

(65) Prior Publication Data

US 2021/0299555 A1 Sep. 30, 2021

(51) Int. Cl.
*A63F 13/24* (2014.01)
*A63F 13/212* (2014.01)
*G06F 3/01* (2006.01)

(52) U.S. Cl.
CPC ............ *A63F 13/24* (2014.09); *A63F 13/212* (2014.09); *G06F 3/01* (2013.01)

(58) Field of Classification Search
CPC ........... A63F 13/24; A63F 13/212; G06F 3/01
See application file for complete search history.

(56) References Cited

U.S. PATENT DOCUMENTS

| 10,391,400 B1* | 8/2019 | Mucha ................... A63F 13/214 |
| 10,688,388 B2 | 6/2020 | Sawai |
| 2019/0009172 A1 | 1/2019 | Sawai |

FOREIGN PATENT DOCUMENTS

| JP | 822349 A | 1/1996 |
| JP | 3132531 U | 5/2007 |
| JP | 2018000735 A | 1/2018 |
| WO | 2017149888 A1 | 9/2017 |
| WO | 2018079383 A1 | 5/2018 |

OTHER PUBLICATIONS

International Search Report for corresponding PCT Application No. PCT/JP2018/029675, 2 pages, dated Oct. 23, 2018.
Notice of Reasons for Refusal for corresponding JP Application No. 2020-535378, 6 pages, dated Jul. 6, 2021.
International Preliminary Report on Patentability and Written Opinion for corresponding PCT Application No. PCT/JP2018/029675, 11 pages, dated Feb. 18, 2021.

* cited by examiner

*Primary Examiner* — Yingchuan Zhang
(74) *Attorney, Agent, or Firm* — Matthew B. Dernier, Esq.

(57) ABSTRACT

A controller device to be worn on a hand of a user includes a plurality of sensor sections that detect the fingers of the user and a sensor support section for supporting the sensor sections. The sensor support section supports the sensor sections in such a manner that the distance between mutually adjacent sensor sections is changeable.

9 Claims, 4 Drawing Sheets

(a)

(b)

CONTROLLER DEVICE

TECHNICAL FIELD

The present invention relates to a controller device that is to be worn on a hand of a user.

BACKGROUND ART

Controller devices used, for example, with a home video game console detect the motion of a hand of a user and transmit information indicating the detected user motion to the main body, for example, of a video game console.

Further, studies have been conducted in recent years on a controller device that is regarded as one of the above-mentioned controller devices and worn on a hand of a user to detect the motion of each finger of a user (bending and stretching of each finger) by using a plurality of sensors disposed on the surface of the controller device.

SUMMARY

Technical Problems

However, the size of hands varies from one user to another. In reality, therefore, it is difficult to determine which one of a plurality of sensors disposed on the surface of the controller device has detected which finger of a user is bent or stretched.

Further, parts of the controller device that are reachable by the fingertips of a user vary with the size of user's hands. Therefore, if, for example, the sensors are disposed so as to match users having relatively large hands in a situation where a user has bent a finger (brought the finger into contact with the main body of the controller device) while the controller device is worn on a small hand of the user, there may arise a case where the finger does not reach a certain sensor and is determined to be stretched (not brought into contact with the main body of the controller device). As described above, there may be a case where the controller device fails to detect the motion of fingers of a user with sufficient accuracy depending on the variation of the size of user's hands.

That is, it is desired that the user be able to adjust the positional relationship between the sensors and the fingers according to, for example, the size of the user's hands.

The present invention has been made in view of the above circumstances. An object of the present invention is to provide a controller device that is capable of adjusting the positional relationship between the sensors and each finger of the user.

Solution to Problems

According to an aspect of the present invention for solving the above conventional problems, there is provided a controller device to be worn on a hand of a user. The controller device includes a plurality of sensor sections that detect the fingers of the user and a sensor support section for supporting the sensor sections. The sensor support section supports the sensor sections in such a manner that a distance between the sensor sections that are mutually adjacent is changeable.

Further, according to another aspect of the present invention for solving the above conventional problems, there is provided a controller device to be worn on a hand of a user. The controller device includes a controller device main body and adjustment means. The adjustment means adjusts a distance between the controller device main body and the palm of the user.

Advantageous Effect of Invention

The present invention is able to adjust the positional relationship between sensors and each finger of a user.

DESCRIPTION OF EMBODIMENTS

Figure 1:
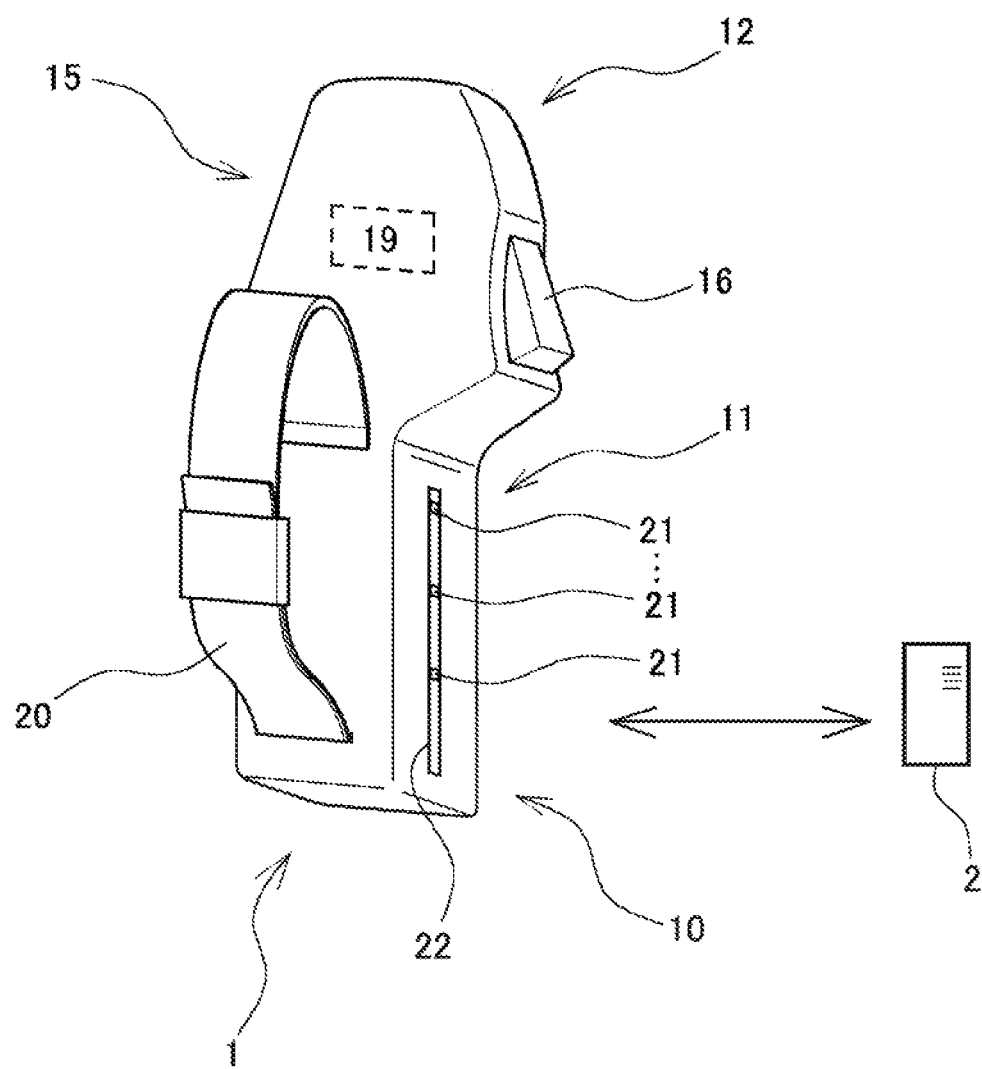
FIG. 1 is a perspective view illustrating an external shape example of a controller device according to an embodiment of the present invention.

An embodiment of the present invention will now be described with reference to the accompanying drawings. As illustrated in FIG. 1, a controller device 1 according to the embodiment of the present invention includes a controller main body 10 and a fixing implement 20, and is communicatively connected in a wired or wireless manner to an information processing device 2. In the following description of the present embodiment, for example, the size and arrangement of various sections and the size ratio between the various sections are merely illustrative and not restrictive. The present embodiment is not limited, for example, to depicted sizes, ratios, and arrangements.

The fixing implement 20 of the controller device 1 includes, for example, a ring-shaped belt member both ends of which are fastened to the controller main body 10. A user inserts four fingers, namely, the index finger to the little finger, between the fixing implement 20 and the controller main body 10, and tightens the belt member of the fixing implement 20 (narrows a ring-shaped portion) so as to fasten the controller main body 10 to a hand of the user. As a result, even if the user stretches a finger so that the controller main body 10 gripped by the user is no longer gripped, the controller main body 10 does not fall off the user's hand.

The controller main body 10 includes a grip section 11 and an operating section 12. The grip section 11 can be gripped by at least some fingers of the user (the middle to small fingers in the present example) inserted into the fixing implement 20. The grip section 11 is formed substantially in a polygonal column shape. The operating section 12 is formed continuously from the grip section 11.

A plurality of finger sensor sections 21 arranged along a longitudinal direction of the grip section 11 are mounted on a surface of the grip section 11. The finger sensor sections 21 are disposed at positions reached by the middle to small fingers of the user (the individual fingers gripping the grip section 11) when the user grips the grip section 11 (bends the user's fingers to bring them into contact with the grip section 11), and at the positions where the fingers leave when the user stretches the fingers.

Figure 2:
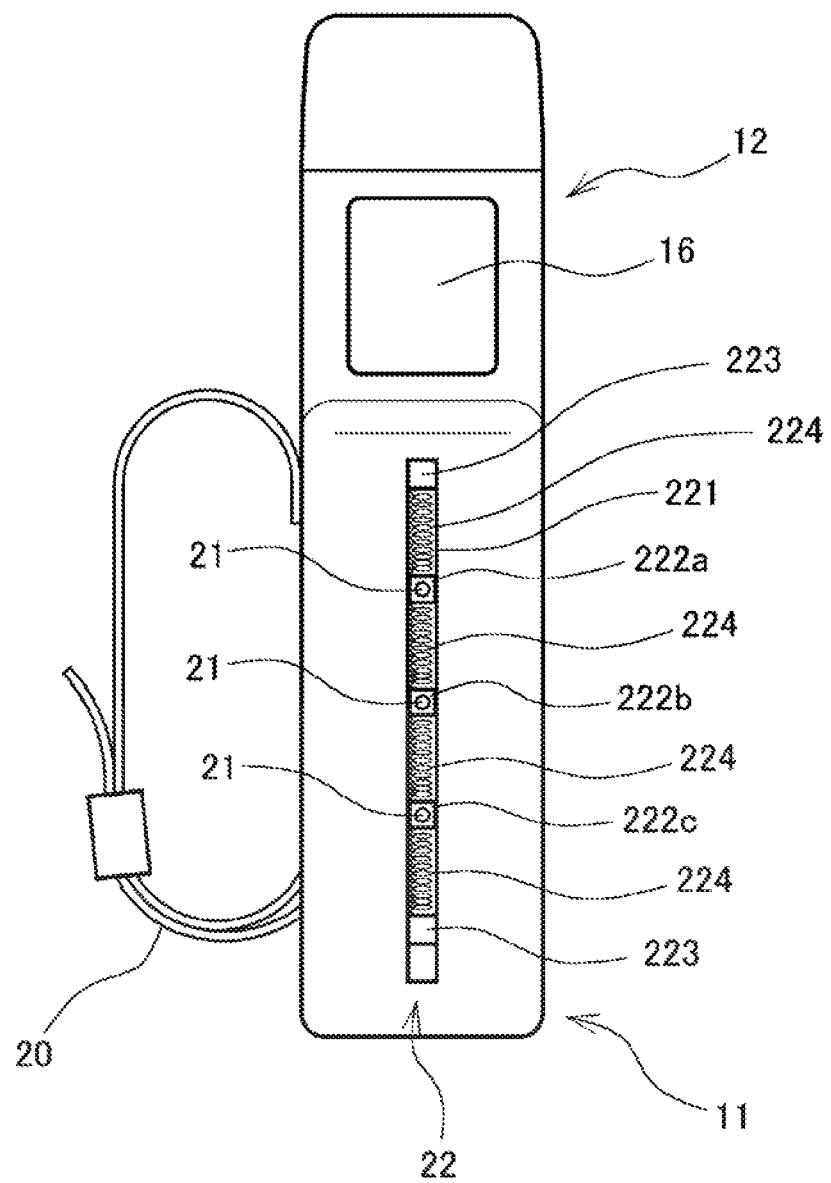
FIG. 2 is a schematic rear view illustrating an arrangement example of finger sensors disposed on the controller device according to the embodiment of the present invention.

The finger sensor sections 21 each include, for example, an electrostatic sensor or an infrared sensor, detect the proximity or contact of a finger, and output a finger detection signal indicating the proximity or contact of the finger. In an example of the present embodiment, the finger sensor sections 21 are supported by a sensor support section 22. Here, as illustrated in FIG. 2, the sensor support section 22 includes a rail member 221, a plurality of supports 222, a plurality of end fixing sections 223, and a plurality of elastic bodies 224. The rail member 221 is linear in shape and disposed along the longitudinal direction of the controller main body 10. The supports 222 and the end fixing sections 223 are movable along the rail member 221. The elastic bodies 224 are each disposed between the mutually adjacent supports 222 and between the end fixing sections 223 and the supports 222 adjacent to the end fixing sections 223.

In the above example of the present embodiment, as described later, the rail member 221 is sufficiently longer than the length between the middle and small fingers of a common user gripping the grip section 11.

The supports 222 correspond to the respective finger sensor sections 21. The number of disposed supports 222 is the same as the number of disposed finger sensor sections 21. Further, the end fixing sections 223 are disposed closer to the ends of the rail member 221 than the supports 222a and 222n at both ends (upper and lower ends), which are among the supports 222a, 222b, . . . , 222n moving on the rail member 221.

Moreover, the end fixing sections 223 are switchable between two different states. In one state, the end fixing sections 223 move on the rail member 221. In the other state, the end fixing sections 223 are secured to the rail member 221. More specifically, the end fixing sections 223 may be securable to the rail member 221 by using, for example, screws. The user loosens the screws for securing the end fixing sections 223 to the rail member 221, moves the end fixing sections 223 to desired positions on the rail member 221, tightens the screws when the end fixing sections 223 are moved to the desired positions, and secures the end fixing sections 223 placed at the desired positions to the rail member 221. In this example of the present embodiment, the end fixing sections 223 function as restriction means for restricting an arrangement range of the finger sensor sections 21.

The elastic bodies 224 are each disposed between the mutually adjacent finger sensor sections 21, and in the present example, disposed between the supports 222 supporting the finger sensor sections 21 and between the supports 222 and the end fixing sections 223. The elastic bodies 224 exert pressure in the direction of increasing the interval between the mutually adjacent supports 222 or the interval between the mutually adjacent supports 222 and the end fixing sections 223. Consequently, the elastic bodies 224 each function as means for exerting pressure in the direction of moving the finger sensor sections 21 away from each other.

It is assumed in an example of the present embodiment that the elastic bodies 224 have a common elastic modulus (hook coefficient). This ensures that the individual elastic bodies 224 receive the same force and contract when the terminal pair of end fixing sections 223 is secured to the rail member 221. Therefore, the supports 222 moving on the rail member 221 (and the finger sensor sections 21 supported by the supports 222) are evenly distributed between the terminal pair of end fixing sections 223.

In the present embodiment, it is preferable that the finger sensor sections 21 each detect the proximity or contact of one of the user's fingers. Therefore, the range within which the supports 222 for supporting the finger sensor sections 21 are disposed is equivalent to at least the length L between the middle and small fingers of the user. It is assumed in the present example of the present embodiment that the supports 222 are evenly distributed between the pair of end fixing sections 223. Accordingly, when the number of supports 222 (finger sensor sections 21) is N, the length between the end fixing sections 223 is $L \times (N+1)/(N-1)$, which is calculated by multiplying $(N+1)$ by the distance $L/(N-1)$ between the mutually adjacent supports 222. Consequently, the length of the rail member 221 is determined to be at least $L\,\text{max} \times (N+1)/(N-1)$ by using the maximum length $L\,\text{max}$ between the middle and small fingers of a user having possibly the largest hands and the number N of disposed finger sensor sections 21. In the present example, it is necessary that the longitudinal length of the grip section 11 sufficiently exceed the length of the rail member 221.

The operating section 12 includes a button operation section 15 and a rocker button 16. The button operation section 15 is mounted on the front surface of the operating section 12. The rocker button 16 is mounted on the rear surface of the operating section 12. Further, a control circuit 19 is included in this operating device 10.

The button operation section 15 is disposed at a position that is reached by the thumb of the user when the user grips the grip section 11 (bends the user's fingers to bring them into contact with the grip section 11).

The rocker button 16 is disposed at a position that is reached by the index finger of the user when the user grips the grip section 11 (bends the user's fingers to bring them into contact with the grip section 11). The axis of rotation of the rocker button 16 is along the width direction of the operating section 12. The rocker button 16 is swing-operated between a first position and a second section. When swing-operated around the axis of rotation, the rocker button 16 is protruded in the first position, and is depressed in the second position.

The control circuit 19 acquires descriptions of an operation performed to press the button operation section 15 and an operation of the rocker button 16, and transmits information describing the operations to the information processing device 2. Further, the control circuit 19 converts the output of each of the finger sensor sections 21 to a digital value, and transmits the digital value to the information processing device 2 as the information indicating the result of finger detection. It is assumed that the information indicating the result of finger detection is pre-adjusted to remain "0" before the distance between a finger and the finger sensor section 21 is shorter than a predetermined distance R, increase as the distance between the finger and the finger sensor section 21 decreases and becomes shorter than the predetermined distance R, and reach the maximum value (e.g., "255") when the distance is "0" (a state where the finger is in contact with the finger sensor section 21).

The information processing device 2, which is, for example, a home video game console, operates in accordance with a program such as a game program. The information processing device 2 receives information describing a button operation and information indicating the result of finger detection from the controller main body 10, and performs processing, for example, to execute the game program by using the received information.

The present embodiment has the above-described configuration and operates as described below. Before using the controller main body 10, the user sets the positions of the end fixing sections 223 according to the size of the hands of the user. It should be noted in the following example that, when the grip section 11 is gripped by the user, the side toward the little finger on the rail member 221 is referred to as a lower side while the side toward the middle finger is referred to as an upper side.

Figure 3:
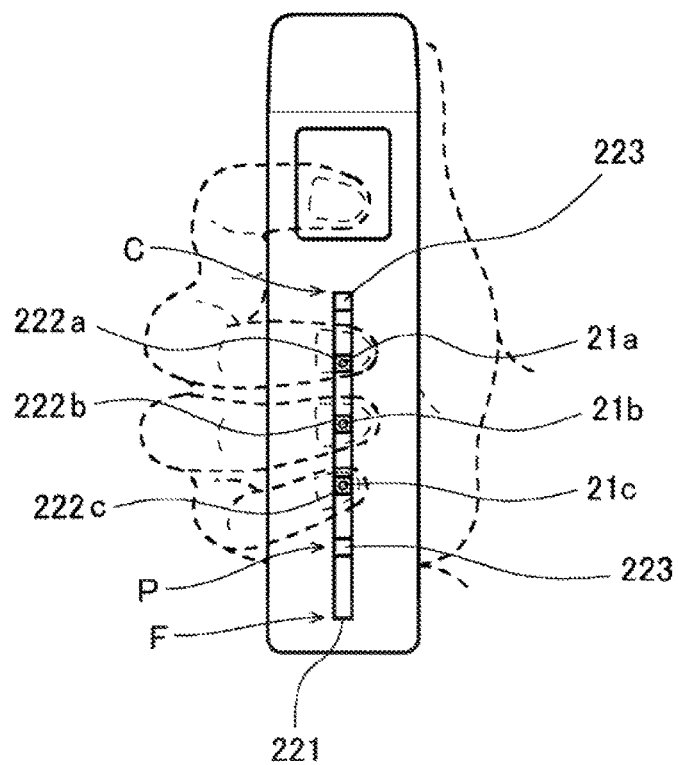
FIG. 3 is a set of diagrams illustrating an adjustment example of the arrangement of the finger sensors disposed on the controller device according to the embodiment of the present invention.
Figure 3:
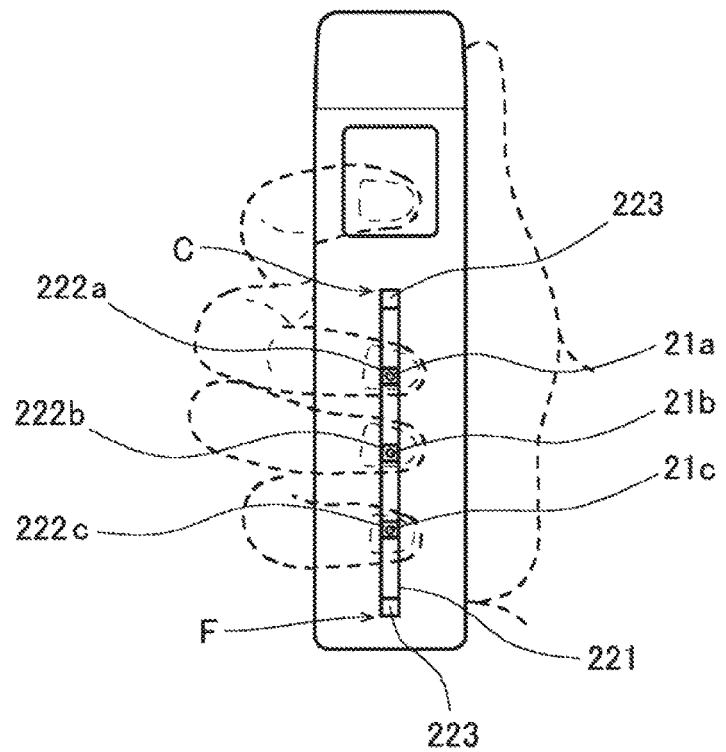

More specifically, as illustrated in FIG. 3(a), a user having relatively small hands secures the lower end fixing section 223 at a position P on the rail member 221 that is shifted upward from the lower end F of the rail member 221. It should be noted that the upper end fixing section 223 is secured to the upper end C of the rail member 221. Further, it is assumed in the present example that the number N of finger sensor sections 21 is the number of fingers to be detected (that is, N=3 because the middle, ring, and little fingers are to be detected in the present example).

In the above instance, the elastic bodies 224 exert pressure in the direction of moving the mutually adjacent finger sensor sections 21 away from each other. Therefore, when the end fixing section 223 is secured at the above-mentioned position P, the elastic bodies 224 receive the same force and contract. As a result, the finger sensor sections 21 are evenly distributed between the terminal pair of end fixing sections 223, that is, between the position C at the upper end of the rail member 221 and the position P to which the lower end fixing section 223 is secured (the length between the position C and the position P is assumed to be "1").

Consequently, the position P of the lower end fixing section 223 can be determined so as to ensure, when a user having relatively small hands grips the grip section 11 (with the middle to little fingers) in a state where the rocker button 16 is operable by the index finger, that the middle finger (the interval between the index finger and the middle finger does not significantly vary) comes into contact with the finger sensor section 21a closest to the upper end of the rail member 221, and that the little finger comes into contact with the finger sensor section 21c closest to the upper end of the rail member 221.

Meanwhile, a user having relatively large hands secures the lower end fixing section 223 to the lower end F of the rail member 221 as illustrated in FIG. 3(b). It should be noted that the upper end fixing section 223 is secured to the upper end C of the rail member 221.

Consequently, as for the user having relatively large hands, the intervals between the finger sensor sections 21 are adjusted so as to ensure, when the user grips the grip section 11 (with the middle to little fingers) in a state where the rocker button 16 is operable by the index finger, that the middle finger comes into contact with the finger sensor section 21a closest to the upper end of the rail member 221, and that the little finger comes into contact with the finger sensor section 21c closest to the upper end of the rail member 221.

It is assumed in the foregoing examples that one upper end fixing section 223 and one lower end fixing section 223 are disposed to be movable on the rail member 221. However, in a case where the upper end fixing section 223 is to be secured to the upper end of the rail member 221 as indicated in the above example, the upper end fixing section 223 may be pre-secured to the rail member 221. Further, when such a configuration is adopted, the upper end fixing section 223 need not always be disposed. As regards the upper end, the support 222 for supporting the finger sensor section 21 associated with the middle finger (the support 222a for supporting the uppermost finger sensor section 21a) may be secured at a predetermined position on the rail member 221.

If the length between the finger sensor section 21a in the uppermost position and the lower end fixing section 223 is L in a case where the above-mentioned configuration is adopted, the finger sensor sections 21 within the length L−L/N between the finger sensor section 21a and the uppermost finger sensor section 21n are disposed at intervals of L/N.

Further, the lower end fixing section 223 need not always be disposed. Alternatively, at least either one of the supports 222 associated with the lowermost and uppermost finger sensor sections 21 may be made switchable (e.g., by using a screwing method) between two different states, namely, a state where the support 222 is movable on the rail member 221 and a state where the support 222 is secured to the rail member 221. Furthermore, the supports 222 associated with the respective lowermost and uppermost finger sensor sections 21 may be both secured to the rail member 221.

In the above example, when the length between the uppermost finger sensor section 21a and the lowermost finger sensor section 21n is L, N finger sensors within the length L are disposed at intervals of L/(N−1).

Moreover, it is assumed in the foregoing description that the finger sensor sections 21 are evenly distributed within a prescribed length for arranging the finger sensor sections 21. However, the present embodiment is not limited to such a configuration. For example, the elastic modulus may vary from one elastic body 224 to another. More specifically, for example, the elastic body 224 between the finger sensor section 21 associated with the middle finger and the finger sensor section 21 associated with the ring finger may be more unlikely to contract than the elastic body 224 between the finger sensor section 21 associated with the ring finger and the finger sensor section 21 associated with the little finger.

Further, each of the supports 222 associated with the respective finger sensor sections 21 may be switchable between two different states, namely, a state where the support 222 is movable on the rail member 221 and a state where the support 222 is secured to the rail member 221. For example, in a case where the supports 222 are secured to the rail member 221 with screws or other fasteners, the user may loosen the screws of the supports 222, move the supports 222 to desired positions, and secure the supports 222 at the desired positions on the rail member 221 by using the screws.

Furthermore, the foregoing description deals with a case where the supports 222 or the end fixing sections 223, which are switchable between the movable state and the secured state, are moved on or secured to the rail member 221 by using screws. However, the present embodiment is not limited to such a method. For example, an alternative method is to form either one of male/female engaging parts on the rail member 221, form the other one of male/female engaging parts on targets, namely, the supports 222 or end fixing sections 223 switchable between the movable state and the secured state, disengage the male/female engaging parts in the movable state (e.g., form the engaging parts with an elastic member to disengage the engagement when a force is applied), and allow the male/female engaging parts to engage with each other to secure the targets to the rail member 221 in the secured state.

The configuration described in the above example is also able to support the finger sensor sections 21 in a state where the distance between the mutually adjacent finger sensor sections 21 can be changed.

[Example of Operating Together with Fixing Implement]

Figure 4:
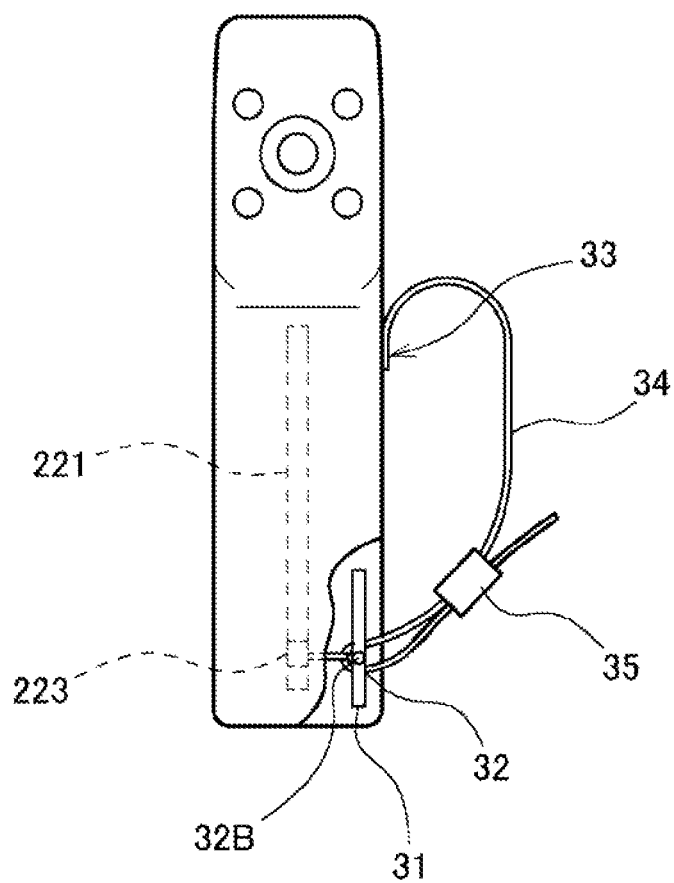
FIG. 4 is a diagram illustrating an example of a fixing implement disposed on the controller device according to the embodiment of the present invention.

Additionally, in an example of the present embodiment, the arrangement range of the finger sensor sections 21 may be adjusted in conjunction with the fixing implement 20. In this example, as illustrated in FIG. 4, the fixing implement 20 includes a rail member 31, a belt terminal 32, a belt fixing section 33, a belt 34, and a buckle 35. The belt terminal 32 is movable on the rail member 31. For the sake of explanation, the grip section 11 depicted in FIG. 4 is partially broken.

The rail member 31 is disposed within a predetermined range of the lower end of the grip section 11 and extends along the longitudinal direction of the grip section 11. The belt terminal 32, which is movable on the rail member 31, includes a column-shaped support rod 32B. The support rod 32B extends in the width direction of the grip section 11, and the belt 34 is wound around the support rod 32B. FIG. 4 depicts only the bottom surface of the support rod 32B because it is viewed from a plane perpendicular to the longitudinal direction of the support rod 32B.

The belt fixing section 33 is disposed on the side relatively toward the upper end of the grip section 11, and one end of the belt 34 is secured to the belt fixing section 33. The one end of the belt 34 is secured to the belt fixing section 33, which is positioned on the side relatively toward the upper end of the grip section 11. Meanwhile, the other end of the belt 34 is wound around the support rod 32B of the belt terminal 32 and secured by the buckle 35 disposed on the belt 34.

The user inserts the index to little fingers between the belt 34 and the controller main body 10 until the base of the thumb approximately reaches the controller main body 10. In the resulting state, the user tightens the belt 34. In this instance, the belt terminal 32 around which the belt 34 is wound moves on the rail member 31 toward the upper portion of the grip section 11. The movement of the belt terminal 32 is then restricted when the belt 34 comes into contact with the hypothenar region of a hand of the user (a position corresponding to the fifth metacarpal bone). In this state, the user fixes the length of the belt 34 by using the buckle 35.

The present example of the present embodiment is characteristic in that the belt terminal 32 and the lower end fixing section 223 operate together so as to move the lower end fixing section 223 on the rail member 221 according to the movement of the belt terminal 32.

As an example, the belt terminal 32 may be coupled to the lower end fixing section 223 by using a link disposed in the grip section 11 so that the amount of movement of the belt terminal 32 is conveyed directly as the amount of movement of the lower end fixing section 223. When this configuration is adopted, the lower end fixing section 223 is disposed at the end of the little finger. In this case, the lower end fixing section 223 need not always be secured to the rail member 221.

Further, it is assumed in the above example that the lower end fixing section 223 is disposed and moved according to the movement of the belt terminal 32. However, if the lower end fixing section 223 is not disposed in the present embodiment, the support 222*n* disposed at the lower end may move according to the movement of the belt terminal 32. In this case, the support 222*n* should be coupled to the belt terminal 32 by using the link disposed in the grip section 11.

According to the above example, the belt 34 of the fixing implement 20, which secures the main body of the controller device 1 to a hand of the user, is configured such that the perimeter of a ring formed by the belt 34 can be adjusted according to the size of the hand of the user. Therefore, the lower end fixing section 223 (or a lower end support 222), which functions as the restriction means, moves according to the perimeter of the ring formed by the belt 34, and thus restricts the arrangement range of the finger sensor sections 21. Consequently, in the present example, when the user merely winds the fixing implement 20 around the user's hand without having to make adjustments, the finger sensor sections 21 are evenly distributed within the width range of the user's hand and disposed at respective positions corresponding to the user's fingers.

It should be noted that, if an operation is performed, for example, to severely shake the controller device 1 in a case where the supports 222 are coupled together with the elastic body 224, the elastic body 224 may deform to vary the intervals between the finger sensor sections 21. In view of such circumstances, an acceleration sensor may be disposed in the controller device 1 and used to detect the acceleration of the controller device 1, and then information regarding the detected acceleration may be transmitted to the information processing device 2 together with the information indicating the result of detection of the finger sensor sections 21.

It is assumed that the information processing device 2 receives, for example, the information indicating the result of detection of the finger sensor sections 21 on a periodic basis, and stores the last received information. However, if the information regarding the acceleration of the controller device 1 indicates an acceleration greater than a predetermined threshold value, the information processing device 2 does not store but discards the information that is indicative of the result of detection of the finger sensor sections 21 and received while the acceleration is greater than the predetermined threshold value.

Consequently, the information obtained immediately before the movement is greatly accelerated is used as is. In a case where the acceleration is great, it is highly conceivable that the controller device 1 is gripped by the user. Therefore, in a case where the information regarding the acceleration of the controller device 1 indicates an acceleration greater than the predetermined threshold value, the information processing device 2 may assume that the user's fingers are closed (to grip the controller device 1), and perform processing without regard to the result of detection of the finger sensor sections 21.

[Example of Making Palm-to-Finger Sensor Section Distance Adjustable]

Additionally, in the present embodiment, an attachment 40 may be attachable to a portion of the controller device 1 that comes into contact with the palm of the user (the thenar surface of the user's hand). The attachment 40 is integral with the housing of the controller device 1.

The attachment 40 adjusts the interval between the grip section 11 and the user's palm (thenar surface), and may be of any shape. However, the attachment 40 is preferably integral with the housing of the controller device 1. Therefore, it is preferred that the attachment 40 have a surface shaped to match the curved surface of the housing of the controller device 1. Attaching or detaching the attachment 40 adjusts the distance between the user's palm (thenar surface) and the finger sensor sections 21.

Figure 5:
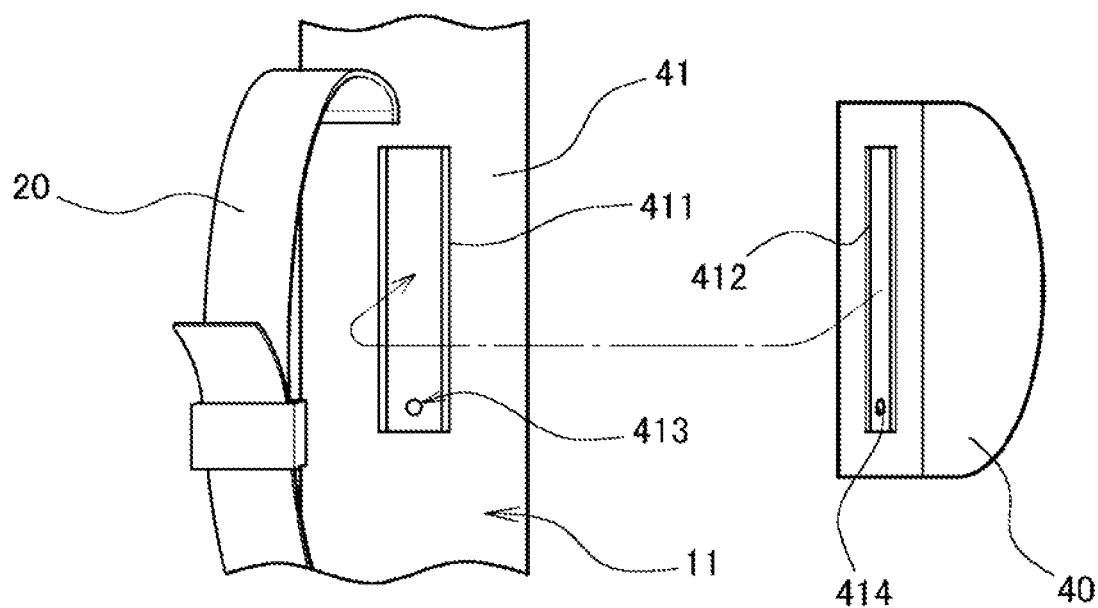
FIG. 5 is a diagram illustrating an example of an attachment detachably disposed on the controller device according to the embodiment of the present invention and an example of a connecting section for the attachment.

That is, in the present example, an attachment mount 41 is disposed on a surface of the grip section 11 of the controller device 1 on which the fixing implement 20 is mounted. As illustrated, for example, in FIG. 5, the attachment mount 41 includes a rail member 411 that is disposed on the face of the grip section 11. Further, in this case, a slide groove 412 is formed on the side of the attachment 40. The slide groove 412 engages with the rail member 411 and is able to slide on the rail member 411.

Moreover, a protrusion 413 is disposed on the attachment mount 41. According to a user operation, the protrusion 413 is able to move between two different states, for example, a protruded state and a retracted state. A notch 414 may be formed on the side of the attachment 40. The notch 414 engages with the protrusion 413 (i.e., the movement of the attachment 40 is restricted by the notch 414) while the attachment 40 is mounted on the attachment mount 41.

The user secures the attachment 40 by engaging the slide groove 412 of the attachment 40 with the rail member 411 of the controller device 1, sliding the attachment 40 on the rail member 411 to dispose the attachment 40 at a predetermined position, and placing the protrusion 413 in the protruded state.

As a result, the outer perimeter of the grip section 11 is extended by the width of the attachment 40. This ensures that the grip section 11 is easily operated by a user having relatively large hands (e.g., the finger sensor sections 21 are just reachable by the user's fingertips).

Further, the grip section 11 is easily operated by a user having relatively small hands when the user removes the attachment 40 (moves the protrusion 413 into the retracted state, moves the slide groove 412 of the attachment 40 along the rail member 411 to disengage the slide groove 412 from the rail member 411, and removes the attachment 40). The outer perimeter of the grip section 11 is then restored to its original state (a state where the attachment 40 is still not attached). In this state, the grip section 11 is easily operated by the user.

Although the above example describes the attachment and detachment of the attachment 40, the perimeter of the grip section 11 of the controller device 1 may alternatively be changed by deforming the grip section 11 of the controller device 1. An example alternative is to prepare a balloon that inflates when air is introduced into it, dispose the balloon on a surface of the grip section 11 that is on the side where the fixing implement 20 is mounted, and inflate or deflate the balloon as needed to change the outer perimeter of the grip section 11.

It should be noted that, in the example of the present embodiment in which the distance between the palm and the finger sensor sections are made adjustable, the intervals between the individual finger sensor sections need not always be adjusted. That is, the individual finger sensor sections 21 may be fixed at predetermined positions on the grip section 11.

REFERENCE SIGNS LIST

1 Controller device, 2 Information processing device, 10 Controller main body, 11 Grip section, 12 Operating section, 15 Button operation section, 16 Rocker button, 19 Control circuit, 20 Fixing implement, 21 Finger sensor section, 22 Sensor support section, 31 Rail member, 32B Support rod, 32 Belt terminal, 33 Belt fixing section, 34 Belt, 35 Buckle, 40 Attachment, 41 Attachment mount, 221 Rail member, 222 Support, 223 End fixing section, 224 Elastic body, 411 Rail member, 412 Slide groove, 413 Protrusion, 414 Notch

The invention claimed is:

1. A controller device to be worn on a hand of a user, the controller device comprising:
   a plurality of sensor sections that detect fingers of the user; and
   a sensor support section for supporting the sensor sections,
   wherein the sensor support section supports the sensor sections in such a manner that a distance between the sensor sections that are mutually adjacent is changeable.

2. The controller device according to claim 1, wherein the sensor support section includes
   an elastic body that is disposed between the sensor sections and used to exert pressure in a direction of moving the sensor sections away from each other, and
   a restriction section for restricting an arrangement range of the sensor sections.

3. The controller device according to claim 2, further comprising:
   a belt that secures a device main body to a hand of the user and has an adjustable perimeter, the adjustable perimeter being adjustable to match a size of the hand of the user,
   wherein the restriction section restricts the arrangement range of the sensor sections according to the perimeter of the belt.

4. The controller device according to claim 1, wherein the sensor support section includes a rail member that supports the sensor sections and enables movement of the sensor sections along the rail member that extends along a main body of the controller device.

5. The controller device according to claim 4, wherein the restriction section comprises end fixing sections disposed at opposite ends of the rail member and which are movable along the rail member.

6. A controller device to be worn on a hand of a user, the control device comprising:
   a controller device main body; and
   an adjustment mechanism that is attached to the controller device main body in which an outer perimeter of a grip section gripped by the hand of the user is extended to adjust a distance between a palm of the user and the controller device main body.

7. The controller device according to claim 6, wherein the adjustment mechanism includes
   an attachment mount that is disposed on a side of the controller device main body, and
   an attachment that is attachable to and detachable from the attachment mount.

8. A controller device to be worn on a hand of a user, the controller device comprising:
   a controller device main body;
   a plurality of sensor sections that detect fingers of the user;
   a sensor support section for supporting the sensor sections; and
   adjustment mechanism for adjusting a distance between the controller device main body and a palm of the user;
   wherein the sensor support section supports the sensor sections in such a manner that a distance between the sensor sections that are mutually adjacent is changeable.

9. The controller device according to claim 8, wherein the adjustment mechanism includes an attachment that is configured to be attached to and detached from an attachment mount disposed on the controller device main body of the controller device.

\* \* \* \* \*